Patented Oct. 8, 1946

2,409,043

UNITED STATES PATENT OFFICE 2,409,043

HYDROXYLATED CYCLOPENTANO POLYHYDROPHENANTHRENE COMPOUNDS AND METHOD OF MAKING THE SAME

Hans Herloff Inhoffen, Berlin-Wilmersdorf, Germany, assignor to Schering Corporation, Bloomfield, N. J., a corporation of New Jersey No Drawing. Application January 19, 1940, Serial No. 314,687. In Germany January 13, 1939

9 Claims. (Cl. 260—397.4)

The present invention relates to cyclopentano polyhydrophenanthrene compounds and more particularly to compounds of this series having a hydroxyl group at the carbon atom 21 and a method of making the same.

It is well known that a very efficient hormone of the suprarenal cortex, the desoxycorticosterone, can be obtained from natural sources as well as synthetically according to the process of Reichstein as described in Helvetica Chimica Acta 20, page 1164. However, by both methods the hormone is obtained in an unsatisfactory yield.

Now, I have found that compounds of the pregnane series having a hydroxyl group in 21-position, are obtained by reacting 3-hydroxy-20-keto compounds of the pregnane series which may be saturated or unsaturated in the ring system, first with halogenating agents to halogenate the methyl group in the 21-positions and subsequently with agents capable of substituting halogen with acyloxy or hydroxy groups, and finally oxidising the hydroxyl group in 3-position to the keto group.

Instead of 3-hydroxy-20 keto compounds diketo compounds especially such as 3-keto compounds converted into 3-acetals may be employed. Preferably cyclic acetals of saturated and unsaturated ketosteroids are suitable. The acetalisation may be carried out in any manner known per se, as described, for instance, in Jacobsohn and Stelzner "Lehrbuch der Organischen Chemie," 2nd edition, volume 1, page 62 ff. (1923) or in Houben-Weyl, "Die Methoden der Organischen Chemie," 3d edition, volume 3 (1930), page 191–197. The group attached to the 3-keto group may be an ethylene-glycol, propandiol-1.3 or the like. As catalysts during the reaction there may be used toluene sulfonic acid and other sulfonic acids or mineral acids, glacial acetic acid, oxalic acid, acid salts and others. The cyclic acetals are obtained in a nearly quantitative yield.

These acetals may be converted according to methods known per se into ketones, for instance, by acid splitting. Advantageously inorganic acids such as sulfuric acid in suitable solvents such as alcohols (see Houben-Weyl, "Die Methoden der Organischen Chemie," volume 3 (1923), page 161 ff.) may be used.

The saturated or unsaturated 3-hydroxy-20-keto compounds of the pregnane series used as starting materials may have further hydroxy groups in the ring system or groups convertible thereinto by hydrolysis, for instance, in position 11, 12 and/or 17.

When using starting materials saturated in the ring system, the halogen may be attached not only to the carbon atom 21 but also to the carbon atom 17 in case a hydrogen atom is present at the carbon atom 17 which is capable of substitution.

On employing a starting material unsaturated in the ring system, also the ring double bond present will be saturated by halogen. Hence, the last mentioned compounds are preferably treated with a correspondingly larger amount of halogen. The saturation of the ring double bond can also be achieved by a preceding addition of halogen hydride.

The halogenation is carried out according to methods known per se, for instance, by reaction with free halogen as, for instance, bromine, or with substances capable of yielding halogen, preferably in organic solvents.

The dehalogenation in the side-chain is then carried out by a treatment with agents capable of replacing halogen with acyloxy or hydroxy groups. Suitable substances for this purpose are, e. g., inorganic bases. The best results are achieved by a treatment with salts of organic acids, as for example, the alkali salts of acetic acid, propionic acid, benzoic acid and the like whereby the halogen at the carbon atom 21 is replaced by an ester group. On employing as starting material compounds containing an ester group in 3-position it is advisable to use alkali salts of such organic acids as introduce in 21-position an ester group which is more difficultly saponifiable than the ester group in 3-position in order to render possible partial saponification in 3-position for subsequent oxidation.

If unsaturated pregnane compounds are used as starting material, then on dehalogenation the halogen present in the nucleus is split off under simultaneous reformation of the original double bond; but it is also possible to split off the halogen attached to the nucleus before replacing the halogen at the carbon atom 21, by reforming the original double bond according to methods known per se, for instance, by treatment with alkali iodide according to Finkelstein.

If on halogenation compounds are obtained having halogen also at the carbon atom 17, this halogen is split off on dehalogenation whereby a double bond is formed which can be hydrogenated according to methods known per se, for instance, by means of mild catalytic hydrogenation, for instance, by means of nickel, palladium and the like.

The oxidation of the hydroxyl group present in 3-position, to the keto group is carried out according to methods known per se, for instance, according to the process as described in U. S. patent application Ser. No. 145,824, filed June 1, 1937, wherein oxidation is effected by an exchange of oxidation stages with a ketone or aldehyde in the presence of an alcohol-bound metal. In such process, the starting material is heated with a ketone or aldehyde, which is preferably present in excess, in the presence of an alcoholate of a metal, such as aluminum or magnesium, such metal being bound either to the starting compound, or to another alcohol, the starting compound being thereby converted into a ketone, while the ketone or aldehyde reagent is reduced. (This application has since issued as Patent No. 2,379,832, dated July 3, 1945.) If the free hydroxyl group in 3-position is replaced by a group convertible thereinto, for instance, by saponification, then this free hydroxyl group, of course, is to be reformed before oxidation.

If on the other hand the hydroxy group in 21-position is not esterified but free it is to be protected by suitable partial esterification or etherification against the attack of the oxidising agent, for instance, by reaction with triaryl chloromethane.

Finally also ester groups produced by treating the halogenated starting material with agents capable of replacing halogen with acyloxy groups can be transformed into free hydroxyl groups according to methods known per se, for instance, by saponification.

The following formulae serve to illustrate the reaction without, however, limiting the same to them.

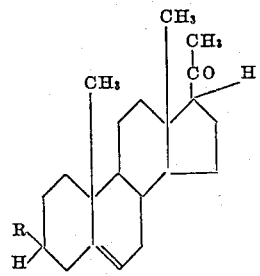

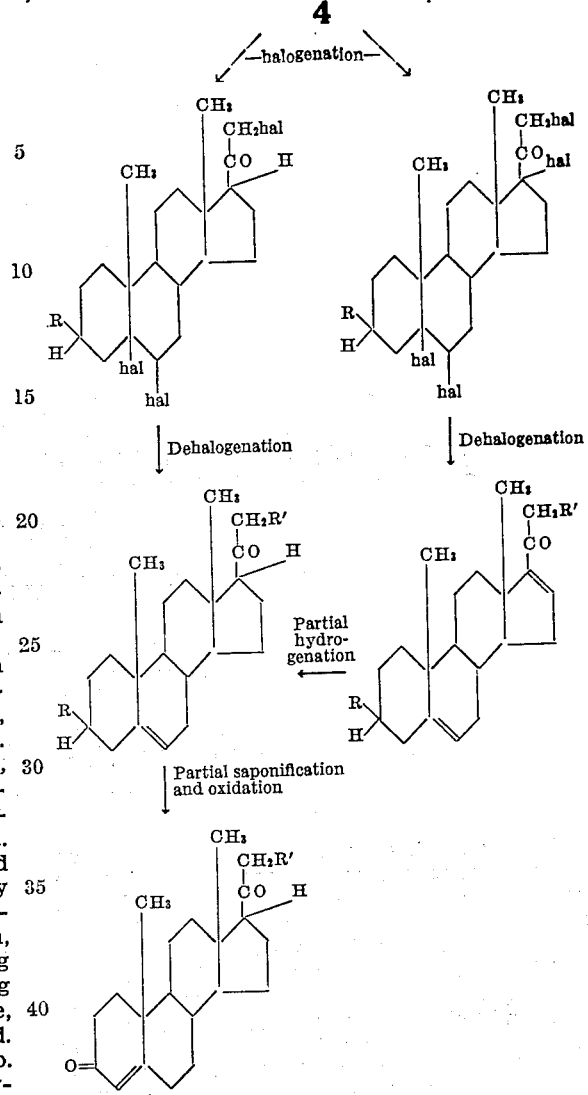

In these formulae R and R' represent hydroxyl groups or groups convertible into the hydroxyl group.

The following examples serve to illustrate the invention without, however, limiting the same to them.

*Example 1*

To a solution of 1 g. of Δ5,6-pregnenol-3-one-20 in 20 cc. of chloroform a solution of 0.35 cc. of bromine in 10 cc. of acetic acid and thereafter some drops of a mixture of hydrobromic acid-acetic acid are added while shaking. After allowing the reaction mixture to stand for a period of time the colour of bromine has disappeared. Then the mixture is diluted with water and the chloroform layer washed with water several times, clarified with calcium chloride and after filtration evaporated to dryness in a vacuum at 35° C. The bromide obtained as an oily residue is dissolved in a little benzene and the mixture diluted with a solution of 5 g. of potassium acetate dissolved in 50 cc. of alcohol. After boiling for half an hour whereby the benzene is evaporated the reaction solution is diluted with water whereby first the potassium bromide is dissolved. On further diluting the mixture an oil separates which is isolated by decanting or by extracting with ether. After subjecting the solution product to a fractional chomatographic adsorption the 21-acetoxy-pregnenolone is obtained.

It can readily be converted into desoxy-corticosterone acetate according to the method as described in U. S. patent application Ser. No. 145,824.

*Example 2*

To a solution of 1 g. of pregnenolone acetate in 25 cc. of chloroform a solution of 0.44 cc. of bromine in 20 cc. of glacial acetic acid is added while shaking. After addition of 4 drops of a mixture of hydrobromic acid-acetic acid the solution is kept standing until decoloration, i. e. about 1 to 2 hours. The chloroform solution is then washed with sodium bicarbonate solution and water and is evaporated to dryness in a vacuum at 40° C. The residue yields after recrystallisation from chloroform-alcohol the 5.6.17.21-tetrabromo pregnenolone acetate in the form of thin leaflets having a melting point of 174–175° C. with decomposition. Yield: 1.15 g.

A solution of 0.5 g. of the tetrabromide obtained as described above, in 15 cc. of benzene is boiled on the water bath with a solution of 0.4 g. of sodium iodide in 7 cc. of alcohol for 2 hours. The reaction solution colored red by iodine is thoroughly shaken with ether and sodium thiosulfate solution whereupon the obtained colorless ethereal layer is evaporated to dryness. The residue is dissolved in a little alcohol while heating. On cooling the 17.21-dibromo-$\Delta_{5.6}$-pregnenolone acetate crystallises from the mixture in thin leaflets melting after recrystallisation from alcohol at 148–149° C. Yield: 0.3 g.

A solution of 1 g. of the above described dibromide in 5 cc. of toluene is boiled under reflux with a solution of 1 g. of potassium benzoate in 20 cc. of butanol for 5 hours. After addition of ether the reaction solution is washed with a solution of soda and with water. The oil obtained after evaporation of the ether represents crude $\Delta_{5.6.16.17}$-pregnadienone-20-diol-3.21 - acetate - 3-benzoate-21 which is further purified by recrystallisation. From this product the known 21-hydroxy-progesterone is obtained by partial hydrogenation of the $\Delta_{16.17}$ double bond, by partial saponification of the 3-acetate group, oxidation of the 3-hydroxy group to a keto group, and saponification of the 21-benzoate group.

Of course, many changes and variations in the reaction conditions, the starting materials used, the halogenating, dehalogenating, hydroxylating, oxidizing, saponifying and the like methods employed, the reaction temperature and duration, and the like may be made by those skilled in the art in accordance with the principles set forth herein and in the claims annexed hereto.

What I claim is:

1. In a process for the production of compounds of the cyclopentano polyhydrophenanthrene series, the step which comprises reacting a member of the group consisting of nuclearly saturated and nuclearly unsaturated 3-R-20-keto compounds of the pregnane series wherein R is a member of the class consisting of

and groups convertible into the latter group with the aid of hydrolysis, there being a methyl group occupying the 21-position, with a halogen to convert said methyl group into —CH₂Hal, Hal standing for halogen.

2. Method according to claim 1, wherein the starting compound contains in the nucleus as a further substituent a member of the class consisting of a hydroxy group and groups convertible into a hydroxy group with the aid of hydrolysis.

3. Method according to claim 1, wherein the starting compound contains a further hydroxy group in at least one of the 11, 12, and 17-positions.

4. Method according to claim 1, wherein the starting material is a pregnenol-3-one-20 compound.

5. Method according to claim 1, wherein the halogen is bromine.

6. Method according to claim 1, wherein the hydroxyl group in 3-position is oxidized to ketonic oxygen by exchange of oxidation stages with a ketone in the presence of an alcohol-bound metal.

7. Method for the production of compounds of the cyclopentano polyhydrophenanthrene series, comprising reacting a member of the group consisting of nuclearly saturated and nuclearly unsaturated 3-R'-20-keto compounds of the pregnane series, wherein R' is a group convertible into

with the aid of hydrolysis, there being a methyl group occupying the 21-position, with a halogenating agent to convert said methyl group into —CH₂Hal, Hal standing for halogen, reacting the product with a salt of an organic acid to replace the 21-halogen with an ester group, the radical of said organic acid being less easily hydrolyzable in the 21-position than the substituent at the 3-position, partially saponifying the product to replace the group at the 3-position with the group

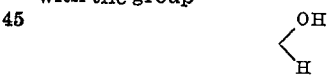

and oxidizing the 3-alcohol group to a keto group.

8. Method for the production of compounds of the cyclopentano polyhydrophenanthrene series, comprising reacting a 3-acetal of a 20-keto compound of the saturated and unsaturated pregnane series with a halogen to convert the methyl group in the 21-position to —CH₂Hal, wherein Hal stands for halogen, then reacting the product with an alkali metal salt of an organic acid to replace the halogen in the 21-position with an ester group.

9. Process according to claim 8 wherein the halogen is bromine.

HANS HERLOFF INHOFFEN.